United States Patent
Dennert et al.

(10) Patent No.: US 8,005,491 B2
(45) Date of Patent: Aug. 23, 2011

(54) METHOD FOR CONTROLLING THE DELIVERY OF MESSAGES IN A TELECOMMUNICATIONS NETWORK WHILE TAKING MULTI-DEVICE CONFIGURATIONS INTO SPECIAL CONSIDERATION

(75) Inventors: Thomas Dennert, Troisdorf (DE); Günter Götz, Höchberg (DE)

(73) Assignee: T-Mobile Deutschland GmbH, Bonn (DE)

( * ) Notice: Subject to any disclaimer, the term of this patent is extended or adjusted under 35 U.S.C. 154(b) by 952 days.

(21) Appl. No.: 10/578,409

(22) PCT Filed: Nov. 10, 2004

(86) PCT No.: PCT/EP2004/012852
§ 371 (c)(1),
(2), (4) Date: Feb. 27, 2004

(87) PCT Pub. No.: WO2005/048622
PCT Pub. Date: May 26, 2005

(65) Prior Publication Data
US 2008/0242320 A1    Oct. 2, 2008

(30) Foreign Application Priority Data

Nov. 11, 2003 (DE) ................................ 103 52 949
Feb. 17, 2004 (DE) ......................... 10 2004 007 856

(51) Int. Cl.
*H04W 68/00* (2009.01)

(52) U.S. Cl. ....................................... 455/458; 455/466

(58) Field of Classification Search .................. 455/458, 455/466
See application file for complete search history.

(56) References Cited

U.S. PATENT DOCUMENTS

| | | |
|---|---|---|
| 5,699,407 A | 12/1997 | Nguyen |
| 5,765,105 A | 6/1998 | Kuriki |
| 6,014,549 A * | 1/2000 | Foladare et al. ............. 340/7.21 |
| 6,393,275 B1 | 5/2002 | Alfred |
| 6,571,100 B1 * | 5/2003 | Lautenschlager ............. 455/445 |
| 2001/0041560 A1 | 11/2001 | Tarkiainen et al. |

FOREIGN PATENT DOCUMENTS

| | | | |
|---|---|---|---|
| DE | 10054379 A1 | | 5/2002 |
| WO | WO9417644 | * | 8/1994 |

OTHER PUBLICATIONS

International Search Report, 4 pages (Feb. 28, 2005).
German Search Report (Apr. 27, 2010, 6 Pages).

* cited by examiner

*Primary Examiner* — Nick Corsaro
*Assistant Examiner* — Amanuel Lebassi
(74) *Attorney, Agent, or Firm* — The Maxham Firm

(57) ABSTRACT

A method for controlling the delivery of messages in a telecommunications network, particularly in a mobile communications network, with data assigned to a subscriber relationship and to a terminal, that is, to the identification chip (for example, GSM, SIM, UMTS, USIM) connected thereto. These assigned data, entirely or in part, are transmitted synchronously or approximately synchronously to additional terminals, that is, to the identification chip (for example, GSM SIM, UMTS USIM) connected thereto, assigned to this subscriber.

33 Claims, 2 Drawing Sheets

METHOD FOR CONTROLLING THE DELIVERY OF MESSAGES IN A TELECOMMUNICATIONS NETWORK WHILE TAKING MULTI-DEVICE CONFIGURATIONS INTO SPECIAL CONSIDERATION

FIELD OF THE INVENTION

This invention pertains to a method to control the delivery of messages in a telecommunications network, particularly in a mobile communications network. The word "messages" is understood to mean the following:
- Messages containing enriched information (for example, pictures);
- Short message;
- E-mails;
- Paging of communication subscribers, with special consideration to multi-device configurations.

BACKGROUND OF THE INVENTION

In today's mobile phone networks, various methods are available which permit a subscriber to utilize multiple terminals (so-called twin-card and multi-card products). The terminal is activated and personalized in a known fashion using an identification chip or subscriber identity module, such as a SIM card.

This product scenario can arise from the parallel use of mobile terminals, such as vehicle phones and organizers, for example. In the process, one or perhaps more terminals are activated simultaneously under a common number.

In designs having more than one terminal activated at the same time, the paging attempts arriving under a common number are signaled in dedicated fashion to the particular active terminal of the subscriber.

Disadvantages of existing methods that use special paging numbers for each terminal result from the appearance of "shadow" numbers. Ramifications of such "shadow" numbers include:
- Additional "shadow" numbers arising for the subscriber for each terminal;
- The number can be reached via paging but not by direct dialing.

Disadvantages of existing methods that only allow delivery to one active terminal result from the limited usage options available to the subscriber. This results in:
- When delivery is to bundled devices, it is easy for delivery to be made to the wrong device;
- Parallel usage of devices is not possible, and only one subscriber identity module (SIM) can be active.

Disadvantages of existing methods that use a serial application of paging/short message centers for intermediate storage of information result from uncertainty as to the condition of the terminal (turned off, not within radio range, occupied). This results in:
- False billing in case of fees that depend on successful delivery;
- False reporting to the sender as to delivery;
- Delayed deliver.

SUMMARY OF THE INVENTION

A purpose of the invention is therefore to provide a method that enables clear, optimal control of the delivery of messages in a telecommunications network. The method of the invention supports public mobile phone networks (for example, GSM based systems).

According to embodiments of the invention, the data assigned to the terminal or its associated identification chip are transmitted entirely or partially, synchronously or approximately synchronously, to other terminals assigned to this subscriber or to their associated identification chips (for example, GSM TM, UMTS USIM). This makes it possible for multiple terminals of a subscriber, for example a main and a secondary device, to be assigned a common paging number in a database which is set up either in a central SS7 routing function (paging control system) or in a swapped system, preferably a new network element in the form of a "signaling element." The common paging number is assigned for at least one application per terminal (for example, MMS via indication, email via indication, location, among others). That is to say, it is preferred that one application is assigned to each terminal.

In this way, it is possible to dynamically/administratively identify a specific terminal as a paging terminal for each application of the subscriber (MMS, SMS, email, among others). The number of the terminal is identified internally to the network as a paging number and is not known to the subscriber and not accessible to him.

If a query is started by a paging/short message center to deliver a message under a common number for all terminals, the paging control system or the swapped routing function of the network translates the common number to the appropriate paging number of the terminal in real time dynamically, wherein the paging number can be different for different network functions/applications (MMS, SMS, email, among others).

The central SS7 routing function is used to forward traffic, distribute loads, and to demultiplex using operation codes or call numbers, Preferably, the assignment of a common number to a paging number occurs dynamically through the associated routing database(s) in the (swapped) routing function that is made up of an additional signaling element, in other words, a signaling element that is expanded to include this functionality. The special signaling element is a new system that re-routes SMS/paging indications through the control of data. This allows dynamic data storage at the signaling element centrally in order to simplify the administration. It allows applications that utilize paging to assign to an application its own paging terminal.

In an advantageous embodiment of the invention, a change in the paging terminal made by the subscriber results in the signaling of a simulated successful delivery in order to force all outstanding paging messages on hold to the new paging terminal as soon as possible and to repeat the paging step for outstanding messages approximately synchronously.

The paging step involves the delivery of one or more associated short message texts, initiated by the paging service, to the designated paging terminal. Furthermore, the pickup of a message text with pictorial information (Email, MMS) can be initiated by delivering the message to the subscriber paging terminal that is specifically dedicated to the application.

If an associated message is not delivered to the respective paging number/designated terminal, for example, for special applications of a cell phone card such as telemetry or upgrade of the mobile phone-specific applications on the SIM card/terminal-specific applications (so-called OTA update), the normal transmission mode must be used. This is accomplished by using a special function (whitelisting function) with an associated database either in the SS7 routing function or in the swapped routing function.

The following embodiments of the invention are considered special cases and options in this case:
1) If, instead of a common number from the sender, an internal network number is used, the sender is blocked in the swapped routing function;
2) If, instead of the common number from the sender, a shadow number is used (a internal network number that is publicly known and used only for transmitting/receiving SMSs), it can be treated as an imported common number for an application, depending on the routing data swapped routing function. For example, in the case of built-in auto cards, the routing "delivery to shadow number" prescribed by the network operator, and optionally by the customer, would be used.

Important advantages of embodiments of the invention are:
Only a single number is needed for multiple devices;
Correct billing in case of fees that depend on successful delivery;
Correct notification of the original party (sender) of successful delivery;
Transmission is always to the correct paging number, never to the "shadow" numbers;
Optimum utilization of network resources;
Optimum availability for paging;
Transparent copying of subscriber numbers from the existing methods to support multiple numbers;
Selection options for the paging device currently active.

If the special, swapped signaling element is used as the routing function, other advantages of the method according to the invention arise, such as:

No manufacturers limitations, that is, it can be used in any GSM network based on existing routing functions;
Existing signaling networks can be utilized with minimum need for specific adjustments;
Only [JRN1] subordinate functions (subgroups) are affected by dynamic updates (that is, the overall risk for the network is less in case of problems);
Segmenting of and implicit resource reservation for traffic.

The method utilizes technology and switching protocols according to international telecommunications standard such as GSM/UMTS/SS7, in particular those according to GSM CAMEL, MAP, and SMS standards. The service logic of the method is based on a central service node and a service database that communicates with and controls the switching processes and mobility/profile databases of the mobile telecommunications network subscriber.

A typical implementation of this approach includes routing functions in the SS7 network or Intelligent Networks (IN). For an SS7 network, the technology according to ITU Q7xx SS7 series and special service load protocol according to 3GPP MAP 29.002 applies in coordination with GSM MSC and GSM HLR. For IN, the technology according to ITU Q 12xx series (see also ETSI CORE INAP protocol according to ETS 300 374, ETSI GSM CAMEL protocol 03.78) applies in coordination with GSM MSC and GSM HLR.

Other advantageous features of embodiments of the invention include the following:
a) The subscriber to a public mobile phone network can activate service features of his public network that are typically associated with a terminal (for example, the identification chip connected thereto such as GSM SIM, UMTS SIM chips) using a terminal and using conventional functions, and such that this change also acts synchronously on the service features of other terminals associated with it that are stored in the network (for example, the identification chip connected thereto) in that the profile of the terminal is queried during the paging step, and this profile is applied in selecting the active paging terminal when paging is being done to one or more of the connected terminals;
b) Optimized control of the delivery of a paging attempt by changing the query in real time;
c) The necessary network resources (routing, storage, duration) for the paging attempt to one or more terminals of a user are minimized by the fact that intelligent accesses are made of the associated queries by the control system, with the necessary resources allocated for this purpose;
d) Existing services of a public mobile phone network and a third party operator for which it is necessary to deliver to a specific device can be used unchanged by limiting the method to a subgroup of all possible paging targets by defining exceptions;
e) The method enables the reflection of a successful page and its associated short message to the original party, that is, it enables the correct billing of fees for successful delivery;
f) Use of conversion of designated paging terminal for different terminals for different applications, such as SMS delivery to a different paging terminal and MMS indication via WAP Push;
g) Application of the method for subscribers to reroute the page to another target/terminal or other target only for a specific application function;
h) Whitelisting in the swapped signaling element enables the support of this function for networks that only offer whitelisting with the SS7 translation types that cannot be set up by every gateway exchange A;
i) Swapping-out of the function in a dedicated network element in order to achieve adaptation to existing networks;
j) Rerouting of all traffic using specific operation codes (smaller networks) or of a section of the traffic using the possible numbers (networks>10 million subscribers) for REALTIME processing in a dedicated network element;
k) Return of all traffic from the swapped signaling element with configurable settings in order to carry out existing network functions; for example, load balancing, HLR routing, module number portability;
l) The assignment of a terminal from a group of terminals can be done under the same number for an application;
m) Simulated successful delivery when the paging terminal/application is changed in order to force delivery to the new paging terminal as soon as possible, and to repeat the paging step approximately synchronously;
n) Use and combination of the above methods to optimize network resources and customer-related system behavior for the execution of an initiated paging attempt to the paging terminal assigned to a user.

BRIEF DESCRIPTION OF THE DRAWING

The objects, features, and advantages of the method according to the invention will be more clearly perceived from the following detailed description, when read in conjunction with the accompanying drawing, in which.

DETAILED DESCRIPTION OF THE PREFERRED EMBODIMENTS

Figure 1:
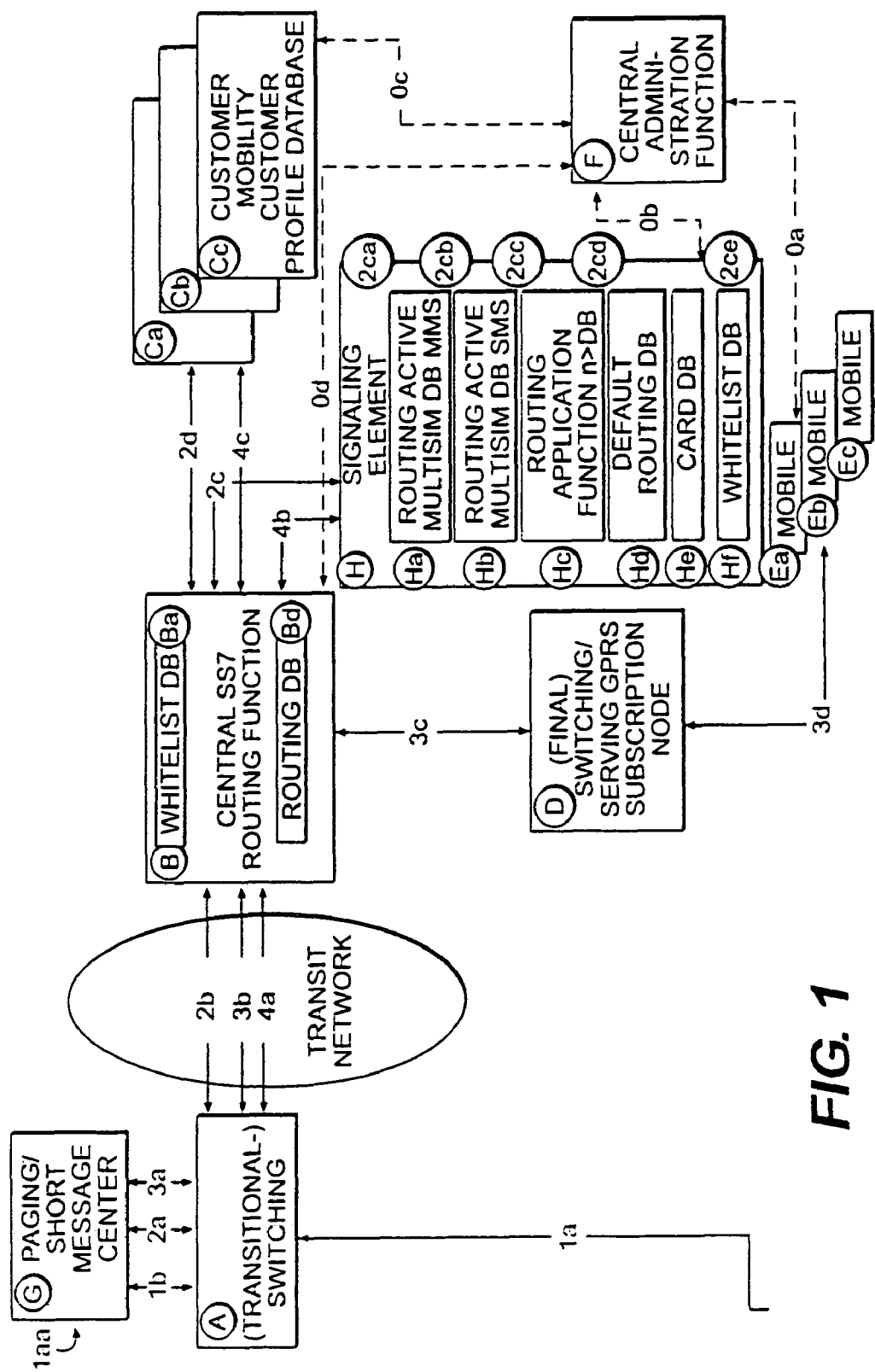
FIG. 1 clarifies the process of a method according to the invention by means of an example.

First of all, the network elements in FIG. 1 are described:
A) Switching equipment of the public network (for example, GSM MSC);
B) Intelligent SS7 routing controls of the public network with integrated or offset database Ba), Bd) for logic controls (whitelisting data) and subscriber data (routing data: for example, IN SCP/SMP or SS7 STP);
Ca/b/c) Mobility/profile database of the public network with contact information and service feature profiles of the mobile phone subscriber (for example, GSM HLR);
D) Switching equipment of the public network (for example, GSM MSC or GSM SGSN);
Ea)/Eb)1Ec) mobile terminal with a single subscriber MSIDSN, wherein one terminal of the subscriber is assigned to each application, for example, terminal Ea for MMS traffic, terminal Eb for SMS traffic, etc;
F) Central administration function (for example, GSM SCP or web server). Subscriber can access the administration function and change his settings and terminal assignment;
G) Paging/short message center (for example, GSM SMSC);
H) Swapped routing function, signaling element where Ha), Hb), Hc), Hd), He), Hf) are swapped databases for routing per application (terminal). Also, there is a whitelist database, identification cards used, etc.

Description of the Methodology as Shown in FIG. 1:

Arrows Oa/b/c indicate dynamic subscriber profile adjustment, for the particular paging behavior desired, done by the subscriber at the terminal via a central administration function F. The settings made by the subscriber are copied into the central routing database Bd, the mobility/profile databases Ca/b/c) and into the swapped databases Ha/b/cIdle. The subscriber has multiple terminals and can indicate here which application, that is, which communication service, is to be directed to which terminal.

Arrow Od represents set up of a whitelisting database Hf/Ba one time for service activation/service discontinuance by writing call number lists to the central routing database Bd or writing operation codes to the central routing database Bd and, depending on the configuration of the network.

Arrows Ia/aa/b show incoming short message to the common number of the subscriber to the paging/short message center G.

Arrows 2a/b/c/d indicate determination of the subscriber's contact information and subscriber profile in the mobility/profile database Ca/b/c. Translation of the number sought from the common number to the terminal-specific paging number in the central SS7 routing function B, or alternatively forwarding of the query from the mobility/profile database Ca/b/c to the signaling element using an operation code or using the routing database Bd (common number and operation code).

Functions 2 *ca/cb/cd* are translations of the respective number sought from the common number to the paging number per application in the signaling element H accordingly using the address of the transmitting network element A and database Ha/Hb/Hc/Hd/He.

Arrows 3 (3*a*, 3*b*, 3*c*, 3*d*) show delivery of the SMS to the corresponding paging number.

Arrows 4*a/b/c* indicate delivery status entry in the mobility/profile database Ca/b/e. Translation of the number sought from the common number to the paging number in the central routing function, or translation of the number sought from the common number to the paging number of the application in the signaling element, analogous to step 2*calcb/cd*.

Each time a query is made at the central SS7 routing function B, the whitelisting function is executed on whitelisting database Ba and a check is done to see whether any translation of the common number may occur. In case 4*a/b/c*, 2*a/b/c*, the whitelist database must contain information to allow the normal process to take place, for example, no conversion of the common number to the paging number occurs.

In the same manner, the whitelisting function Zee is executed on whitelisting database Hf each time the signaling element H is queried and a test is done to see whether any translation of the common number may occur. In case 4*alb/c*, 2*a/b/c*, the whitelist database must contain information to allow the normal process to take place, that is, no conversion of the common number to the paging number is done. After the functions 2*ca/cb/cd*) are carried out and analogous to step 4, the traffic is brought back into the network for further processing with a configurable SS7 translation type in order to avoid circular routing. Furthermore, network functions are then executed in the central SS7 routing function, such as MNP, wherein the configurable SS7 translation type serves as an indication of the functions to be carried out in the central SS7 routing function B.

The following Table 1 offers an example of the determination of a suitable behavior of the whitelist function in network element B and/or network element H:

TABLE 1

| Original transmitter of query (A-party) | Address of querying network element G | Reaction after examination |
| --- | --- | --- |
| In whitelist database Ba | No entry whitelist database Ba | Normal delivery |
| No entry in whitelist database Ba | In whitelist database Ba | Normal delivery |
| In whitelist database Ba | In whitelist database Ba | Normal delivery |
| No entry in whitelist database Ba | No entry in whitelist database Ba | Check to see whether common number, If yes, then translation of the common number to the paging number |

Only if there is no entry in the whitelist database Ba for the transmitter or for the address of the querying network element is the common number converted to the paging number, provided that the common number has been recognized.

The following Table 2 provides an example for the determination of a suitable behavior of the routing function in network element H for the rerouting of all paging traffic to determine the subscriber's contact information:

| Active Target (B-Party) | Entry in CARD database He | Address of querying network element G | Result |
| --- | --- | --- | --- |
| Routing entry SMS database Ha | Populated number | No known element | Conversion of SMS terminal 2ca |
| Routing entry MMS database Hb | Populated number | MMS network element | Conversion of MMS terminal 2cb |
| Routing entry <application function n> database He | Populated number | <Application function n> network element | Conversion <application function n> terminal 2cc |

-continued

| Active Target (B-Party) | Entry in CARD database He | Address of querying network element G | Result |
|---|---|---|---|
| Default routing database Hd | No populated number | Not relevant | No conversion, 2cd, that is, default routing. |

The following Table 3 provides an example for the determination of a suitable behavior of the routing function in network element H for the rerouting subscriber sections where there are multiple cards;

TABLE 3

| Active target (B-Party) | Address of querying network element | Result |
|---|---|---|
| Routing entry SMS database Ha | No known network element | Conversion of SMS terminal 2ca |
| Routing entry MMS database Hb | MMS network element | Conversion of MMS terminal 2cb |
| Routing entry <application function n> database He | <Application function n> network element | Conversion <application function n> terminal 2cc |

Figure 2:
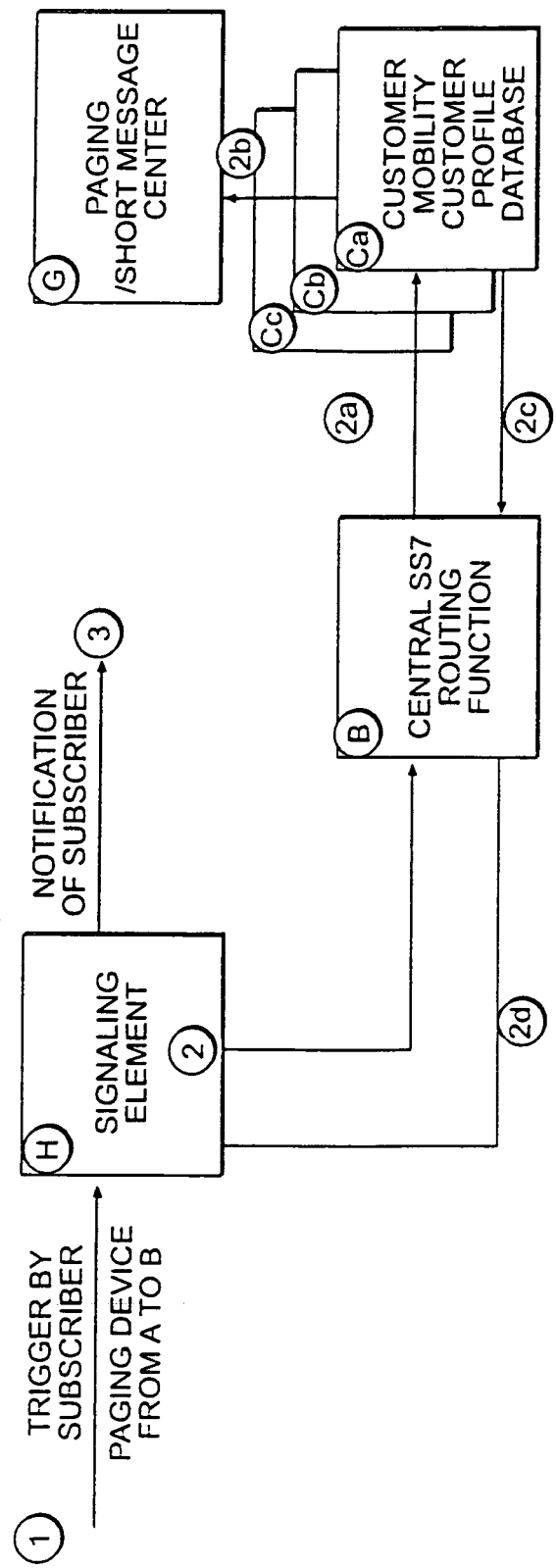
FIG. 2 describes the methodological procedure in making a change to the paging terminal/application as determined by the subscriber.

FIG. 2 shows the procedure when the paging terminal/application is changed as determined by the subscriber.

If a specific trigger (1) is received from the subscriber to change the profile for the corresponding paging application/terminal (trigger, for example, via USSD, SMS, http, among others), the data in the signaling element H are changed in the corresponding database.

Parallel with this, a successful delivery (2a/b) to the mobility/profile database Da is signaled for the paging application/terminal to be replaced. For example, in FIG. 2 the mobility/profile databases Ca since a change request by the subscriber from b to a is indicated.

The corresponding mobility/profile database forces (2b) the start of a new delivery attempt, that is, to all paging/short message centers (G) registered as being on hold with outstanding, waiting messages. The delivery of pages/short messages from the service (G) to the paging application/terminal of the subscriber is routed to the new corresponding paging application/terminal of the subscriber by means of the modified setting in the signaling element H.

In parallel with this, the subscriber is notified that his change has been made (3).

The invention claimed is:

1. A method to control the delivery of messages in a telecommunications network using service feature data that are assigned to a subscriber account and a terminal or the identification chip connected to it, the method comprising:
   transmitting these assigned service feature data, entirely or in part, approximately synchronously to multiple terminals assigned to this subscriber or identification chips connected thereto;
   in a database, assigning a common paging number to a multiple group of terminals of the subscriber;
   the database is set up in a central SS7 routing function, paging control system, and/or in a swapped routing function, signaling element;
   via a central administration function, assigning the service feature data to at least one subscriber profile that can be changed by the subscriber at a said terminal assigned to this subscriber;
   changing the profile synchronously on the service features of other terminals or identification chips connected thereto assigned to this subscriber that are stored in the network when a page is received at any one of the plurality of terminals; and
   activating the telecommunications network service features associated with a terminal assigned to this subscriber or with the identification chip connected to said terminal remotely by said terminal and conventional functions so that when the profile of the terminal assigned to this subscriber is queried during the paging step this profile is applied in selecting the active paging terminal when paging is being done to at least one of the connected terminals.

2. The method according to claim 1, wherein at least one network function/application is assigned to each terminal of the subscriber.

3. The method according to claim 1, wherein if a query is started by a paging/short message center to deliver a message under the common number for all of the subscriber's terminals, the central SS7 routing function or the swapped routing function of the network translates the common number to the paging number that is assigned to the target terminal and/or the network function/application in real time dynamically, wherein the paging number can be different for different network functions/applications.

4. The method according to claim 1, and further comprising:
   determining the subscriber's contact information and the subscriber profile in a mobility/profile database when a message arrives;
   translating the number sought from the common number to a terminal-specific paging number in the central SS7 routing function; and
   sending the message out to the corresponding paging number.

5. The method according to claim 1, and further comprising making a delivery status entry in a mobility/profile database in connection with the paging number.

6. The method according to claim 1, wherein the changes made by the subscriber are copied to a central routing database, to mobility/profile databases, and to swapped databases.

7. The method according to claim 1, and further comprising setting up whitelisting databases for one-time activation/deactivation of the method by writing call number lists into a central routing database or writing operation codes into the central routing database, depending on the configuration of the network.

8. The method according to claim 1, and further comprising:
   executing, each time a query is made at the central 8S7 routing function, a whitelisting function using a whitelisting database; and
   performing a check to see whether any translation of the common number to the paging number can occur.

9. The method according to claim 1, and further comprising: executing, each time a query is made at the signaling element, a whitelisting function using a whitelisting database; and
   performing a check to see whether any translation of the common number to the paging number can occur.

10. The method according to claim 1, wherein changes to the paging terminal determined by the subscriber result in signaling of a simulated successful delivery such that all outstanding, waiting paging messages are forced to the new paging terminal as fast as possible and such that the paging step is repeated approximately synchronously for outstanding messages.

11. The method according to claim 2, wherein if a query is started by a paging/short message center to deliver a message under the common number for all of the subscriber's terminals, the central SS7 routing function or the swapped routing function of the network translates the common number to the paging number that is assigned to the target terminal and/or the network function/application in real time dynamically, wherein the paging number can be different for different network functions/applications.

12. The method according to claim 2, and further comprising:
determining the subscriber's contact information and the subscriber profile in a mobility/profile database when a message arrives;
translating the number sought from the common number to a terminal-specific paging number in the central SS7 routing function; and
sending the message out to the corresponding paging number.

13. The method according to claim 2, and further comprising making a delivery status entry in a mobility/profile database in connection with the paging number.

14. The method according to claim 2, wherein the changes made by the subscriber are copied to a central routing database, to mobility/profile databases, and to swapped databases.

15. The method according to claim 2, mad further comprising setting up whitelisting databases for one-time activation/deactivation of the method by writing call number lists into a central routing database or writing operation codes into the central routing database, depending on the configuration of the network.

16. The method according to claim 3, and further comprising:
determining the subscriber's contact information and the subscriber profile in a mobility/profile database when a message arrives;
translating the number sought from the common number to a terminal-specific paging number in the central SS7 routing function; and
sending the message out to the corresponding paging number.

17. The method according to claim 3, and further comprising making a delivery status entry in a mobility/profile database in connection with the paging number.

18. The method according to claim 3, wherein the changes made by the subscriber are copied to a central routing database, to mobility/profile databases, and to swapped databases.

19. The method according to claim 3, and further comprising setting up whitelisting databases for one-time activation/deactivation of the method by writing call number lists into a central routing database or writing operation codes into the central routing database, depending on the configuration of the network.

20. The method according to claim 3, and further comprising:
executing, each time a query is made at the central SS7 routing function, a whitelisting function using a whitelisting database; and
performing a check to see whether any translation of the common number to the paging number can occur.

21. The method according to claim 3, and further comprising:
executing, each time a query is made at the signaling element, a whitelisting function using a whitelisting database; and
performing a check to see whether any translation of the common number to the paging number can occur.

22. The method according to claim 3, wherein changes to the paging terminal determined by the subscriber result in signaling of a simulated successful delivery such that all outstanding, waiting paging messages are forced to the new paging terminal as fast as possible and such that the paging step is repeated approximately synchronously for outstanding messages.

23. The method according to claim 16, and further comprising:
determining, when a message arrives, the subscriber's contact information and the subscriber profile in the mobility/profile database;
forwarding the query from the mobility/profile database to the signaling element with the aid of an operation code or a routing database;
determining that the number sought is translated in the signaling element from the common number to one paging number per application accordingly using the address of a transmitting network element and swapped databases; and
determining that the message is sent out to the corresponding paging number.

24. The method according to claim 23, and further comprising making a delivery status entry in the mobility/profile database in connection with the paging number.

25. The method according to claim 23, wherein the changes made by the subscriber are copied to a central routing database, to mobility/profile databases, and to swapped databases.

26. The method according to claim 23, and further comprising setting up whitelisting databases for one-time activation/deactivation of the method by writing call number lists into a central routing database or writing operation codes into the central routing database, depending on the configuration of the network.

27. The method according to claim 4, and further comprising making a delivery status entry in the mobility/profile database in connection with the paging number.

28. The method according to claim 4, wherein the changes made by the subscriber are copied to a central routing database, to mobility/profile databases, and to swapped databases.

29. The method according to claim 4, and further comprising setting up whitelisting databases for one-time activation/deactivation of the method by writing call number lists into a central routing database or writing operation codes into the central routing database, depending on the configuration of the network.

30. The method according to claim 5, and further comprising setting up whitelisting databases for one-time activation/deactivation of the method by writing call number lists into a central routing database or writing operation codes into the central routing database, depending on the configuration of the network.

31. The method according to claim 6, and further comprising setting up whitelisting databases for one-time activation/deactivation of the method by writing call number lists into a central routing database or writing operation codes into the central routing database, depending on the configuration of the network.

32. An arrangement of system components of a telecommunication network to carry out a method to control the delivery of messages in a telecommunications network using service feature data that are assigned to a subscriber account and a terminal or the identification chip connected to it, the arrangement comprising:

- means for transmitting these assigned service feature data, entirely or in part, approximately synchronously to multiple terminals assigned to this subscriber or identification chips connected thereto;
- means for assigning a common paging number to multiple terminals of the subscriber in a database, wherein the database is set up in a central SS7 routing function, paging control system, and/or in a swapped routing function, signaling element;
- means for assigning the service feature data to at least one subscriber profile that can be changed by the subscriber at a said terminal assigned to this subscriber via a central administration function;
- wherein the means for assigning is configured to change synchronously the service features of other terminals or identification chips connected thereto assigned to this subscriber that are stored in the network;
- means for enabling the subscriber to activate the telecommunications network service features associated with a terminal assigned to this subscriber or with the identification chip connected to said terminal by using said terminal and conventional functions so that when the profile of the terminal assigned to this subscriber is queried during the paging step and this profile is applied in selecting the active paging terminal when paging is being done to one or more of the connected terminals;
- databases and data processing units are configured to distribute service feature data assigned to individual subscribers is made possible; and a routing function, swapped from the telecommunications network, in the form of a signaling element, the signaling element being connected to a central routing function, and databases being located in the signaling element and/or the central routing function.

33. The arrangement according to claim 32, wherein if a query is started by a paging/short message center to deliver a message under the common number for all of the subscriber's terminals, the central SS7 routing function or the swapped routing function of the network translates the common number to the paging number that is assigned to the target terminal and/or the network function/application in real time dynamically, wherein the paging number can be different for different network functions/applications.

* * * * *

UNITED STATES PATENT AND TRADEMARK OFFICE
CERTIFICATE OF CORRECTION

| | | |
|---|---|---|
| PATENT NO. | : 8,005,491 B2 | Page 1 of 1 |
| APPLICATION NO. | : 10/578409 | |
| DATED | : August 23, 2011 | |
| INVENTOR(S) | : Thomas Dennert et al. | |

It is certified that error appears in the above-identified patent and that said Letters Patent is hereby corrected as shown below:

Title Page, please change item number (86) as shown below:

"Feb. 27, 2004" should read --Feb. 27, 2007--

Signed and Sealed this
Twenty-seventh Day of September, 2011

David J. Kappos
*Director of the United States Patent and Trademark Office*